United States Patent [19]

Hyland

[11] Patent Number: 5,229,223
[45] Date of Patent: Jul. 20, 1993

[54] AIR-ASSISTED ALKALINE CELL HAVING A MULTILAYER FILM SEAL ASSEMBLY

[75] Inventor: Robert J. Hyland, Bay Village, Ohio
[73] Assignee: Eveready Battery Company, Inc., St. Louis, Mo.
[21] Appl. No.: 784,337
[22] Filed: Oct. 29, 1991
[51] Int. Cl.$^5$ ............................................. H01M 2/12
[52] U.S. Cl. ........................................ 429/29; 429/56; 429/86; 429/174
[58] Field of Search ................ 429/29, 56, 86, 89, 429/174

[56] References Cited

U.S. PATENT DOCUMENTS

| | | | |
|---|---|---|---|
| 2,922,833 | 1/1960 | Philipp | 136/177 |
| 3,214,300 | 10/1965 | Nordvik | 136/173 |
| 3,920,475 | 11/1975 | Nabiullin et al. | 136/86 A |
| 4,581,304 | 4/1986 | Beatty et al. | 429/56 |
| 4,636,446 | 1/1987 | Lee | 429/86 X |
| 4,664,287 | 5/1987 | Wilson et al. | 220/89 A |
| 4,678,725 | 7/1987 | Kikuchi et al. | 429/53 |
| 4,774,155 | 9/1988 | Nientiedt et al. | 429/56 |
| 4,999,264 | 3/1991 | Shepard et al. | 429/174 X |
| 5,051,323 | 9/1991 | Murphy | 429/165 |
| 5,079,106 | 1/1992 | Urry | 429/27 |

OTHER PUBLICATIONS

Cegasa International—"Engineering Manual—Cegasa Air-Alkaline Primary Batteries with Self-Recharging Feature", J. C. L. Zigor Corporation, pp. 1–18 Copyright 1984, The Cegasa Air-Alkaline Battery.

Primary Examiner—Stephen Kalafut
Attorney, Agent, or Firm—Robert W. Welsh

[57] ABSTRACT

A multilayer film seal for use in an air-assisted alkaline cell which comprises an organic polymeric seal member having a base with at least one opening and a porous multilayer plastic film disposed onto the base in which said multilayer plastic film comprises at least one inner layer of plastic film, such as polytetrafluoroethylene, sandwiched between two outer layers of a different plastic film that is heat sealed at least at its peripheral area to form an integral bond between the outer layers through the inner layers of the film with the inner layers being porous to air while preventing the cell's electrolyte from passing out from the cell.

22 Claims, 4 Drawing Sheets

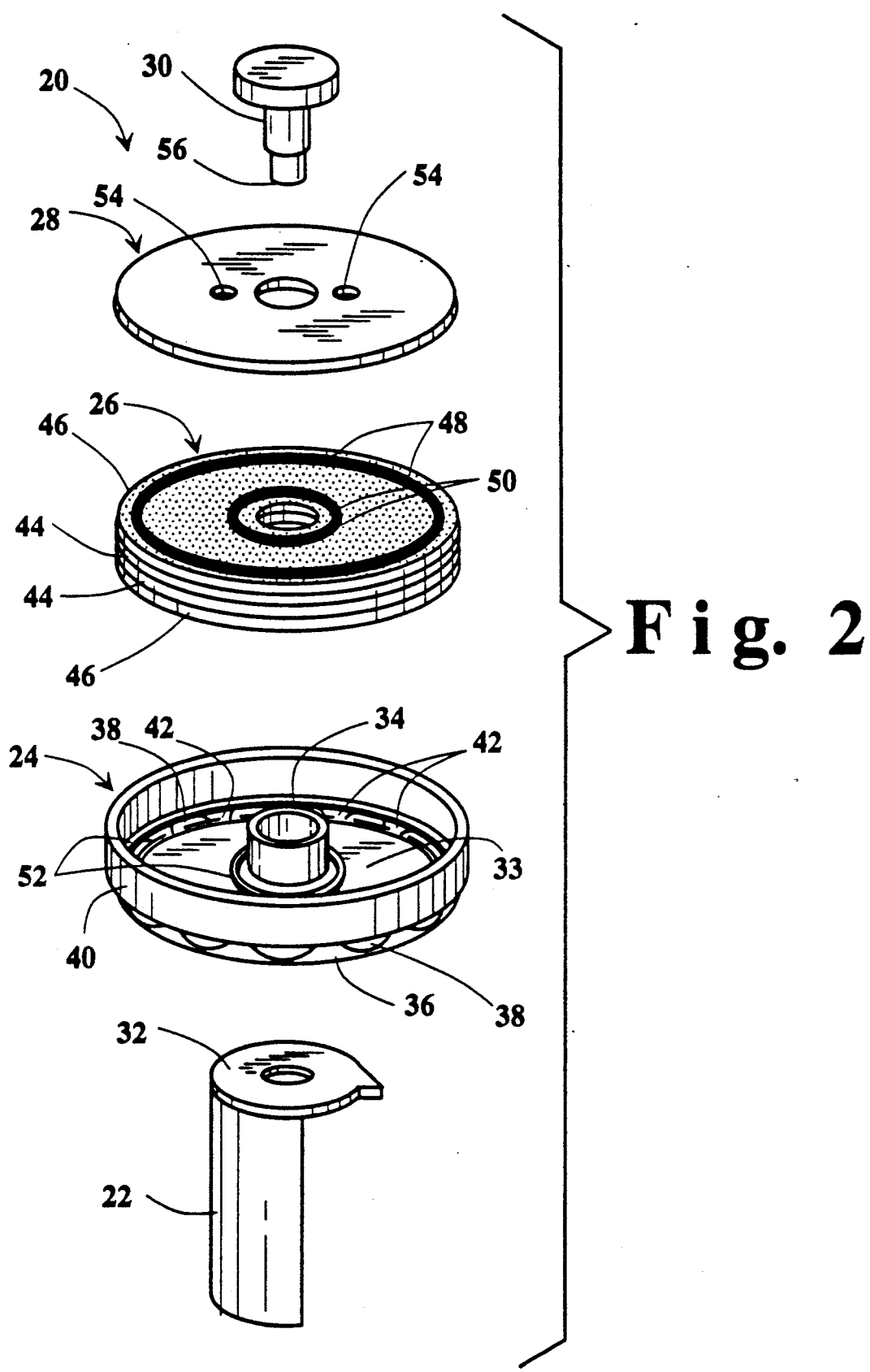

AIR-ASSISTED ALKALINE CELL HAVING A MULTILAYER FILM SEAL ASSEMBLY

FIELD OF THE INVENTION

The invention relates to a multilayer film seal for use in an air-assisted alkaline cell comprising an organic polymeric seal member having a base with at least one opening and a multilayer plastic film disposed onto the base in which said multilayer plastic film comprising at least one inner layer of a first plastic film, such as polytetrafluoroethylene, is sandwiched between two layers of a different plastic film such as polypropylene.

BACKGROUND OF THE INVENTION

Alkaline cells are well known in the art an generally employ a zinc anode, manganese dioxide as the cathode with an aqueous solution of potassium hydroxide for the electrolyte. These cells are readily available commercially for industrial and home applications. Recently a new type of alkaline cell was disclosed by Cegasa International, a Spanish company. This cell, referred to as an air-assisted cell, employs zinc as the anode and manganese dioxide as the cathode with an aqueous solution of potassium hydroxide as the electrolyte. This cell is designed so that the positive electrode containing the manganese dioxide ($MnO_2$) is supported about its periphery and along its full length in the cell by a perforated ribbed air distribution grid. The bottom or negative end of the cell has an insulating support which allows air to enter the cell and pass up along the outside of the supported positive electrode. When the cell is initially put into a circuit, the electrochemical reaction depends primarily upon the presence of the manganese dioxide cathode. As the reaction progresses, and the manganese dioxide cathode is electrochemically reduced, air within the cell reoxidizes and recharges the manganese dioxide. Thus an air-assisted cell is designed to use oxygen in the air to "recharge" manganese dioxide in the cathode. This "recharging" of the manganese dioxide means that the fixed quantity of manganese dioxide in the cathode can be discharged and then recharged numerous times. In contrast, the cathode's ampere hour output in a standard alkaline battery is limited by the quantity of manganese dioxide incorporated in the cell when the cell is manufactured. Therefore, based upon the cathode's ampere hour input, the maximum service obtainable from an air-assisted alkaline battery is greater than the maximum service which can be obtained from a comparably sized standard alkaline battery. The need to get oxygen to the manganese dioxide in an air-assisted alkaline cell means that a portion of the battery, such as the seal, must be designed to allow oxygen to flow through and directly contact the cathode. Contrary to this, the seal in regular alkaline cells is designed to be air tight.

Different types of seals have been used which permit air to pass through the seals while preventing the ingress and/or egress of undesirable materials into and from the cell, respectively. Specifically, the seal must prevent electrolyte from the cell from passing through the seal. Another desirable feature of the seal is to provide a safety vent which will rupture and release the cell's internal pressure when the internal pressure exceeds a predetermined value. Although a seal can be designed to permit air to enter the cell and prevent electrolyte from escaping from the cell, it is difficult to have the seal with these characteristics also function as a safety vent.

It is an object of the present invention to provide a seal for air-assisted cells that can effectively permit air to enter the cell, prevent electrolyte from leaving the cell while also functioning as a safety vent.

It is another object of the present invention to provide a porous seal and safety vent assembly that occupies a minimum space thereby allocating a maximum volume for the active components of the cell.

It is another object of the present invention to provide a seal and safety vent assembly for an air-assisted cell that is easy to make and cost effective to produce.

The above and further objects will become apparent upon consideration of the following description and drawings thereof.

SUMMARY OF THE INVENTION

The invention relates to an air-assisted cell comprising the active components of the cell including an electrolyte, all housed within a container closed by a cover having at least one opening and said cover associated with a seal assembly comprising an organic polymeric seal member having a base with at least one opening and a multilayer plastic film disposed onto the base, said multilayer plastic film comprising at least one inner layer of a first plastic film sandwiched between two outer layers of a different type of plastic film with said two outer layers having substantially the same melting temperature and said melting temperature being lower than the melting temperature of the at least one inner layer of the first plastic film; said two outer layers and said at least one inner layer being porous to permit air to pass through with said inner layer preventing the passage of the cell's electrolyte; said multilayer film heat sealed at least at its peripheral area so that said two outer layers form an integral bond through said inner layer at the peripheral area thereby permitting air to enter through the opening in the cover and through the multilayer film into the cell and said multilayer film designed to rupture upon the build up of a predetermined internal pressure.

Preferably the inner layer of film could be composed of two or more layers, more preferably two layers. The multilayer film must be sufficiently thick to prevent undesirable materials, such as the electrolyte, from exiting the container yet not too thick to prevent the film from rupturing when the internal pressure exceeds a predetermined amount. The inner film must retard penetration of electrolyte while simultaneously permitting air to pass through. The top and bottom films are preferably made of the same material so that successful welding of these films at specific areas will insure an assembled multilayer film that can then be ideally suited for use as porous seals for air-assisted cells. With the top and bottom films having substantially the same melting temperature, then by welding one or more selected areas, an integral bond can be formed through the inner layer of film which has a higher melting temperature. In other words, at the selected areas the heat from the welding will melt the top and bottom films which will then permeate the inner layer of film so that upon cooling an integral bond will form through the inner layer. The top and bottom films are preferably polypropylene films while the inner film is preferably a polytetrafluoroethylene film. As stated above, it is preferred that the top and bottom plastic films be made of the same material so that upon being heated, such as by ultrasonic welding, the films will have the same melting temperature so that at selected areas of the weld, the films will melt and then solidify forming an integral bond through the inner films. It is also preferred to have the melting temperatures of the top and bottom films lower than the melting temperature of the inner film so as to prevent the inner film from melting during the heat bonding step. A suitable top or bottom film can be obtained commercially from Hoechst Celanese Corp., of Somerville, N.J. under its trademark Celgard 4400. This film is a polypropylene film that is made by heat bonding a three mils thick open mesh of polypropylene to a solid one mil thick layer of polypropylene. The open mesh provides structural strength to the film while the one mil thick layer is available for bonding to another polypropylene surface.

As stated above, the inner film has to be porous to air and preferably constructed with a series of interconnected crevices and/or small pores that will enable a flowable material, such as melted polypropylene, to preferably traverse from one side to the other side of the film. The size of the crevices and/or pores can be controlled to inhibit the flow of selected gases and/or liquids. The preferred inner film is polytetrafluoroethylene. In the preferred embodiment, the inner film will have a higher melting temperature than the top and bottom films so that during the heat bonding of the multilayer film, the inner film will not melt causing the pores to collapse and thereby prevent the flow of the melted top and bottom films to the interior of the inner film so as to prevent an integral bond from being formed between the top and bottom films. An integral bond is one that is obtained between a flow of the melted top and bottom film together and then solidifying the films in a selected area into a solid unit.

The thicknesses of the top and bottom films can vary depending upon the particular size and cell system used. For most applications, the thicknesses of the top and bottom films can be from 0.5 mil to 6 mils thick, and most preferably from 1 mil to 4 mils thick. The inner film can be one or more layers with each layer being from 1 mil to 10 mils thick, most preferably from 3 mils to 5 mils thick. A single layer with a specific thickness may be too strong so that it will not rupture when the internal pressure of the cell exceeds a predetermined amount. To overcome this problem, the inner film could be composed of two or more layers that add up to a desired thickness. In this multilayer arrangement, the air flow through the multilayer inner film will be about the same as for a single layer having the same overall thickness but the rupture of the multilayer inner film will be considerably less. Thus by selecting the number of layers for the inner film, the overall multilayer film can be made to rupture when the internal pressure of the cell exceeds a predetermined level. Upon exceeding a predetermined pressure level within the cell, the multilayer film will preferably expand out through the opening in the cover and rupture thereby releasing the internal pressure.

A preferred embodiment of the seal assembly would comprise an organic polymeric seal member having a base, a central opening defined by a centrally upstanding wall, a peripheral upstanding skirt and having at least one opening in the base to permit air to flow into the cell. The multilayer plastic film could be designed with an opening at its center to accommodate the centrally upstanding wall so that it could be disposed onto the base member between the centrally upstanding wall and the peripheral skirt. The multilayer film area near the peripheral upstanding skirt and the multilayer film area near the centrally upstanding wall could be heat bonded using conventional techniques such as ultrasonic welding. By bonding these areas, a secured multilayer film seal member is formed. A neutral cover having at least one opening could be placed over the multilayer film and then an external cover with at least one opening could be placed over the neutral cover and secured to the container of the cell through the use of the peripheral skirt of the seal member.

If desired, the top film could be composed of a spoked wheel configuration, a mesh configuration or a configuration with spaced apart openings to permit the inner film to balloon upward through the opening without undue restriction. Another embodiment would entail the use of an inner top ring of film material that could be bonded to the area near the centrally upstanding wall along with a separate outer top ring of film material that could be bonded to the area near the peripheral upstanding skirt thereby firmly securing the inner layer or layers to the organic polymeric seal member.

BRIEF DESCRIPTION OF THE DRAWINGS

FIG. 2 is an exploded view of the subassembly used in assembling the cell of FIG. 1.

DETAILED DESCRIPTION OF THE PREFERRED EMBODIMENTS

Figure 1:
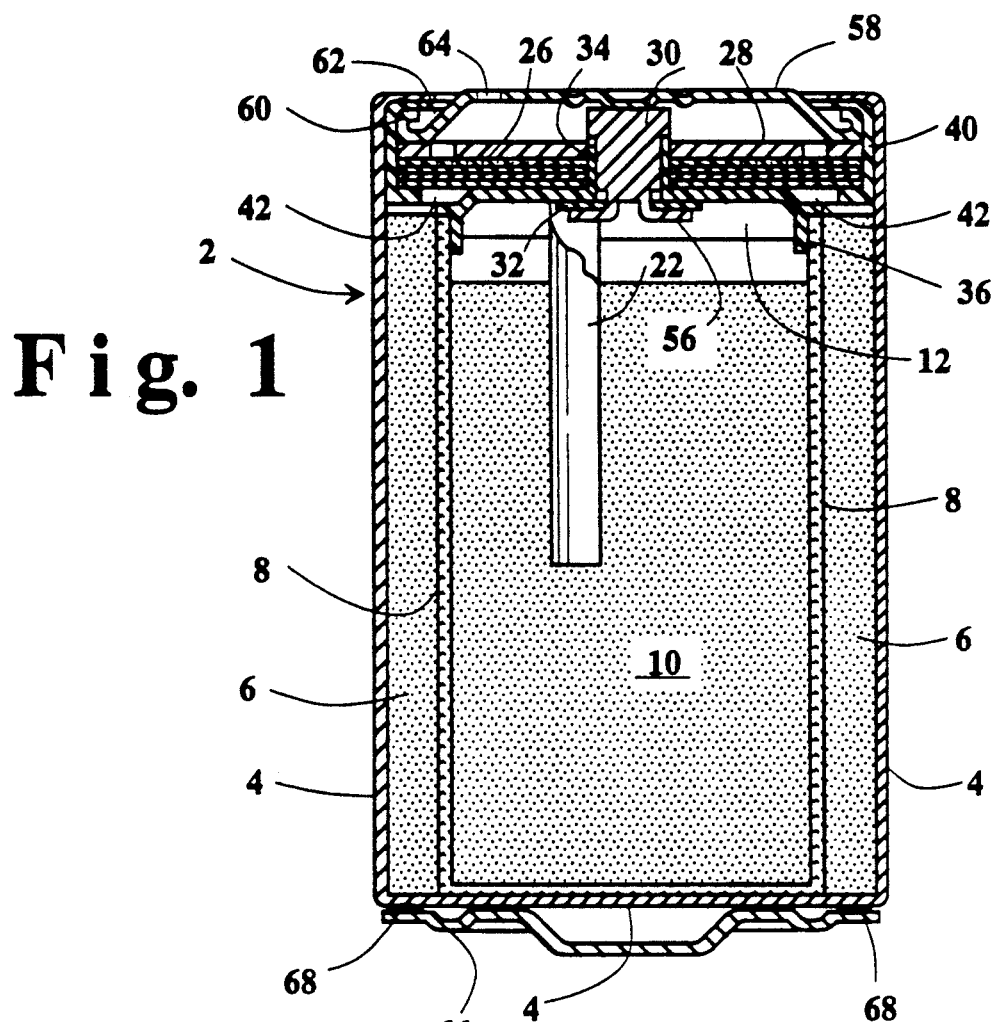
FIG. 1 is a cross sectional view of an inverted air-assisted alkaline cell of the present invention.

Referring to FIG. 1, the air-assisted alkaline cell 2 is assembled in a conventional conductive steel container 4 which also forms an external terminal for the cell. The cathode 6 for the cell 2 is porous manganese dioxide. A good source of highly porous manganese dioxide is so-called chemically synthesized manganese dioxide or CMD. CMD is usually marketed with a porosity of 25% to 35%. However, CMD can be prepared in the form of very porous spheres having a porosity of approximately 60%. The porous spheres have a substantial amount of surface available for reaction with oxygen in an air-assisted cell. To increase the total energy capacity of an air-assisted cell in an air-free environment, substantially solid $MnO_2$ must be available for the cell reaction. A good source of substantially solid $MnO_2$ is electrolytically deposited $MnO_2$ or EMD. EMD can be obtained in the form of dense particles after the electrolytically deposited material is stripped from the electrodes, crushed and screened. EMD has a porosity of approximately 10%–16% and therefore is a substantially solid material. As the ratio of EMD to CMD increases, the cell's air-free capacity also increases. The amount of CMD and EMD used in the cathode of the cell depends on the desired parameters of the cell with, for example, more or less CMD being used per cathode depending on the energy capacity desired in the presence of air. For a good cell capacity in an air-free environment and good rechargeability in an environment containing air, a mixture of 1:5, that is, one part by weight of CMD to five parts by weight of EMD is preferred.

After the cathode 6 is formed in the container 4 a separator 8 is added to physically isolate the anode material 10 from the cathode 6 and the container 4 while still permitting ion transport between the electrodes. The anode mix 10 is then added to the separator lined cavity of the cell. The anode mix 10 comprises a mixture of zinc powder, a gel forming binder and a liquid electrolyte used in the cell. The preferred binder is Carbopol 940 which is a carboxy polymethylene polymer available from the B. F. Goodrich Company, of Cleveland, Ohio. The preferred electrolyte is an aqueous solution of potassium hydroxide.

In an air-assisted cell 2, the discharged active cathode 6, that is the manganese dioxide, undergoes a reaction with the air in the cell and with air which can enter the cell, to become recharged thereby reoxidizing the reduced manganese oxide to manganese dioxide. In the discharge of the alkaline cell, the manganese dioxide is reduced to a lower oxidation state. The oxygen in the air will spontaneously restore or regenerate the higher oxidation state over a period of time. If the cell is subjected to brief periods of high rate discharge, then the cell must be rested for substantial periods of time between each discharge to enable the air to completely recharge the $MnO_2$. However, if the cell is continuously discharged at a rate which is less than the rate at which the $MnO_2$ is recharged by the incoming air, then the air recharges the $MnO_2$ as quickly as it is discharged. In other words, regardless of the rate at which the cell is discharged, if the cell is drained at a low rate or is rested for a sufficient period of time, then the cathode's ability to be recharged is limited only by its access to air. The cathode material is regenerated without involving the zinc anode material. The zinc is oxidized during the discharge but it cannot be regenerated during a rest period. In view of this, less cathode material needs to be added to an air-assisted alkaline cell and, in turn, the volume of zinc can be increased in the cell to increase the overall capacity of the cell.

Returning again to a discussion of FIG. 1, the alkaline electrolyte solution is approximately a 34% to 37% by weight solution of potassium hydroxide in water. The electrolyte from the anode mix 10 permeates the separator 8, and the cathode 6. An open area 12 is left in the cell to provide room for expansion of the anode mix 10.

A subassembly indicated generally by the number 20, referring to FIG. 2, is used to close the cell. The subassembly 20 consists of an anode current collector 22, a seal member 24, a multilayer film 26, a neutral cover 28 and a rivet 30 which is used to join the several pieces together. The anode current collector 22 is made from an electrically conducting metal that is inert to the cell's caustic environment. The collector metal preferably is sheet brass. The anode current collector 22 is rolled to have an arcuate shape with a top flat surface 32 which fits tightly against the bottom of the seal member 24. A nail shaped collector would also be suitable.

Figure 2A:
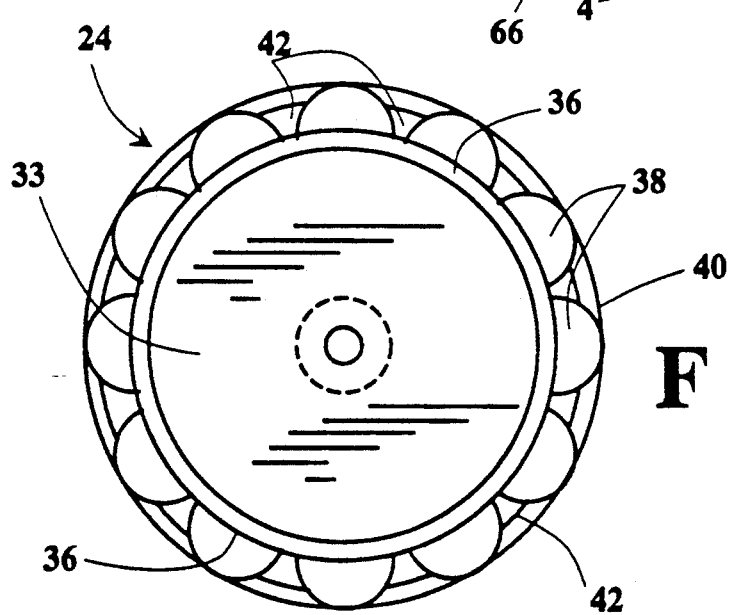
FIG. 2a is a plan view of the air permeable seal member used in the subassembly of FIG. 2.

Referring to FIGS. 2 and 2A, the seal member 24 is made of an organic polymeric material which is compatible with the several components of the cell. The preferred material is polypropylene. The seal member 24 has a substantially flat bottom portion 33 surrounding an inner upstanding wall 34. Below and in line with the periphery of the bottom portion 33 is a substantially circular projecting first wall portion 36. A plurality of circumferentially spaced spokes 38 extend from the periphery of the bottom portion 33 out to and below a peripheral upstanding wall 40 extending upwardly away from bottom portion 33. The open spaces 42 between the spokes 38 provide a passage for air to pass through the seal member 24.

A multilayer film 26 fits within the area of the seal member 24 bounded by the wall 34 and wall 40. The multilayer film 26 is made of two layers of polytetrafluoroethylene 44 sandwiched between two layers of an organic polymeric material such as polypropylene 46. The multilayer film 26 is ultrasonically welded at peripheral area 48 and inner area 50 producing a sealed multilayer assembly. As stated above, if desired, the top layer 46 could have spaced apart openings to permit the inner film 44 to expand with minimum resistance or restriction. The multilayer film 26 can be fastened to the bottom 33 and the spokes 38 by welding, if desired. Preferably, the multilayer film 26 can be disposed onto the bottom 33 and then the layers of the multilayer film 26 can be secured together and to the bottom 33 and spokes 38 by welding, preferably, ultrasonic welding. A fatty polyamide adhesive such as the type disclosed in U.S. Pat. No. 3,92,178 can be used to backup the weld and to prevent creepage of electrolyte between the seal member 24 and the porous multilayer film 26. Two beads of the adhesive can be used. One bead can be placed around the periphery of the bottom 33 where it joins the inside of peripheral wall 40 and the second bead can be placed on the bottom 33 where it joins the inner upstanding wall 34.

To further ensure that the porous multilayer film 26 stays in position, concentric raised inner and outer ridges 52 can be formed on the bottom 33 of the seal member 24. If desired and although not shown two inner ridges and two outer ridges can be formed on the bottom 33 of seal member 24. The multilayer film 26 will then be secured between the ridges 52 on the bottom 33 and the neutral cover 28. The vented neutral cover 28 is preferably made of stainless steel and has a pair of spaced apertures 54 therein to allow the passage of air into the cell. The vented neutral cover 28 will fit within the area of the seal member 24 bounded by the peripheral wall 40. The rivet 30 is preferably made of brass and has a thinned portion 56 which can be easily spread to bind all of the parts of the subassembly 20 together as shown in FIG. 1. The dimensions of the several components of the subassembly 20 and of the overall cell can be varied to meet particular size requirements for the type of cell being assembled.

The subassembly 20 is inserted into the bottom of he inverted cell as shown in FIG. 1. The wall 36 moves the top edge of the separator 8 toward the cathode material 6. The wall 36 and separator 8 protect the anode mix 10 from contact with the air entering the cell. This avoids the loss of zinc due to direct reaction with oxygen. The peripheral wall 40 of the seal member 24 insulates the neutral cover 28 from electrical contact with the container 4. To complete assembly of the cell, a bottom cover 58 is placed into the steel container 4 and is also electrically insulated from contact with the container 4 by the peripheral wall 40 of seal member 24. The bottom cover 58 makes electrical contact with the rivet 30, or other suitable electrically conductive means, enabling the bottom cover 58 to become the second external terminal for cell 2. The edge of the steel container 4, and of the wall 40 of subassembly 20 are then rolled to hold the upturned portion 60 of the bottom cover 58 locked in position on the bottom of the cell 4. A gap 62 surrounds the bottom cover 58, separating it from contact with the container 4. The bottom cover 58 contains three small apertures 64, one of which is shown in FIG. 1, spaced approximately 120° apart which provide a passage for air to enter into the bottom of the cell 2. The air can pass through the subassembly 20 and contact the top portion of the cathode 6 through the air passage 42. The top cover 66 can be fastened to the container by welds 68 after the cathode is rammed into place. It can be added before or after this step as it is merely attached to the container 4.

Figure 3:
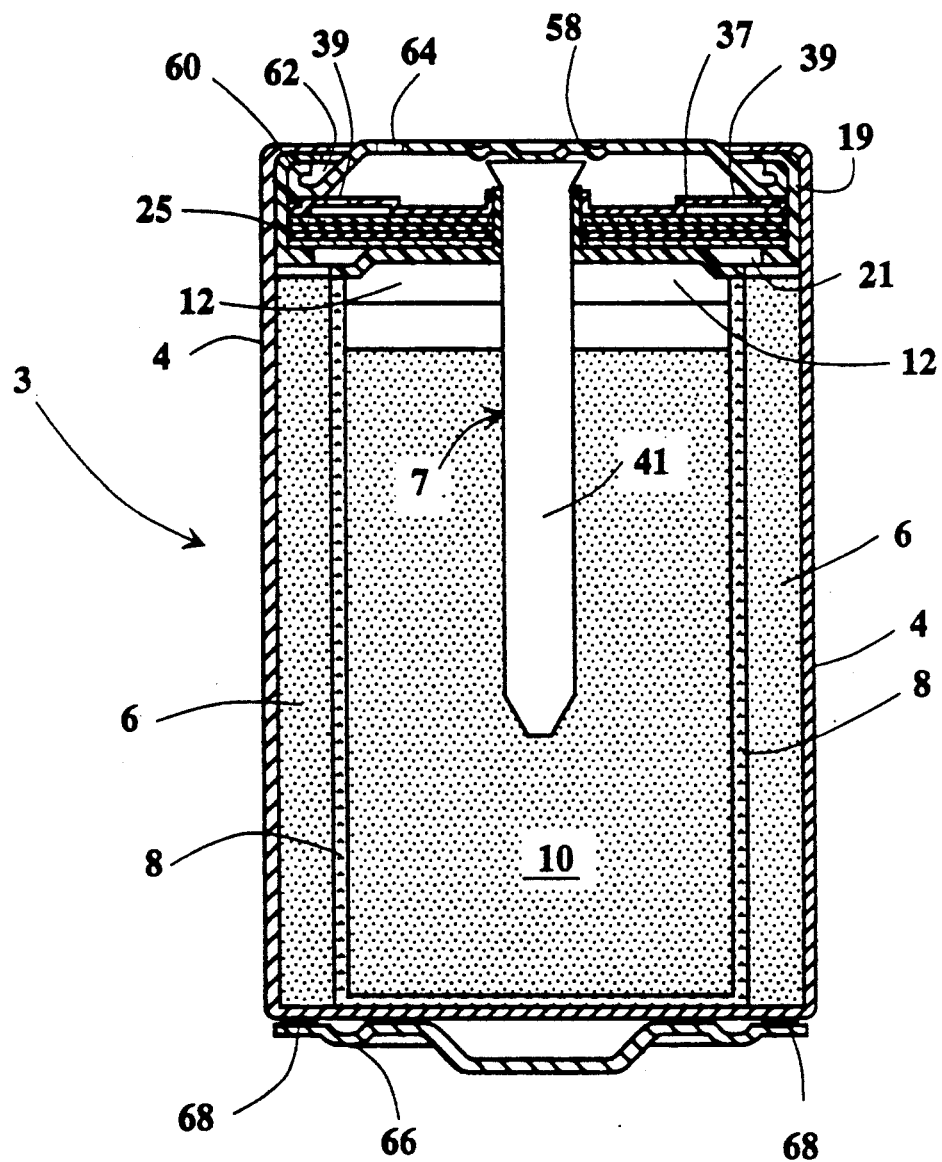
FIG. 3 is a cross sectional view of another embodiment of an inverted air-assisted alkaline cell of the present invention.
Figure 4:
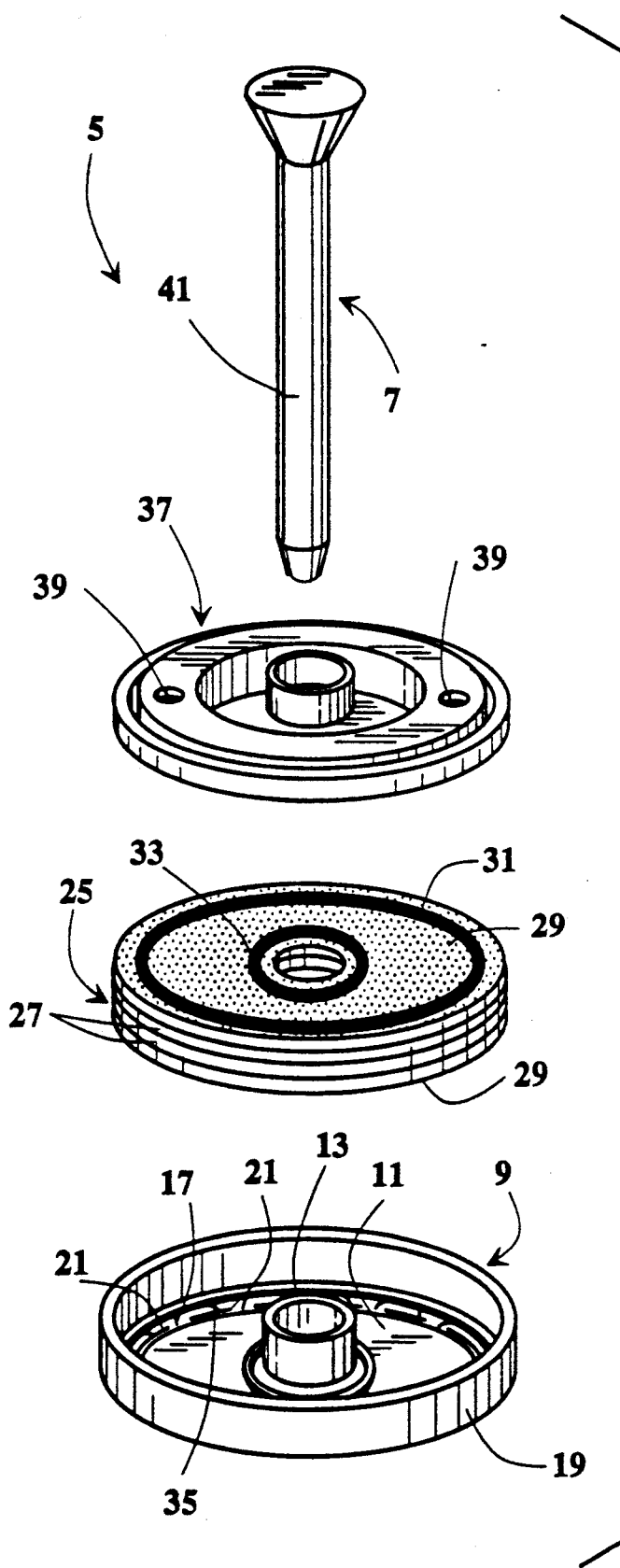
FIG. 4 is an exploded view of the subassembly used in assembling the cell of FIG. 3.

FIGS. 3 and 4 show another embodiment of this invention utilizing a different design seal assembly. Specifically, FIGS. 3 and 4 show an air-assisted alkaline cell 3 that employs several of the same components shown in cell 2 of FIG. 1 and these components are identified with the same reference numbers. A subassembly 5 as shown in FIG. 4 is used to close cell 3 as shown in FIG. 3. The subassembly 5 consists of an anode current collector nail 7 made from an electronically conducting metal. A seal member 9 is made of an organic polymeric material which is compatible with the components of cell 3 with the preferred material being polypropylene. The seal member 9 has a substantially flat bottom portion 11 surrounding an upstanding inner wall 13.

A plurality of circumferentially spaced spokes 17 extend from the periphery of the bottom portion 11 out to and below a peripheral upstanding wall 19 extending upwardly away from bottom portion 11. The spaces 21 between the spokes 17 provide a passage for air to pass through the seal member 9.

A multilayer film 25 fits within the area of the seal member 9 bounded by the peripheral wall 19 and inner wall 13. The multilayer film is made of two layers of polytetrafluoroethylene 27 sandwiched between two layers of an organic polymeric material such as polypropylene 29. The multilayer film 25 is ultrasonically welded at peripheral area 31 and inner area 33 producing a sealed multilayer assembly. As stated above, if desired, the top layer 29 could have spaced apart openings to permit the inner film 27 to expand with minimum resistance or restriction. The multilayer film 25 can be fastened to the bottom 11 and the spokes 17 by welding, if desired. A fatty polyamide adhesive, such as the type disclosed in U.S. Pat. No. 3,922,178 can be used to backup the weld and to prevent electrolyte creep between the polypropylene seal 9 and the porous multilayer film 25. Two beads of the adhesive can be used. One bead is placed around the periphery of the bottom 11 where it joins the inside of peripheral wall 19 and the second bead can be placed on the bottom 11 where it joins the inner upstanding wall 13. To further ensure that the porous multilayer film 25 stays in position, concentric raised ridges 35 can be formed on the bottom 11 of the seal 9. The multilayer film 25 will then be secured between ridges 35 on the bottom 11 and the neutral cover 37. The vented neutral cover 37 is made of stainless steel and has a pair of spaced apertures 39 therein to allow the passage of air into the cell. The vented neutral cover 37 will fit within the area of the seal member 9 bounded by the peripheral wall 19. A conductive nail 7, preferably made of brass and having a thinned portion 41 which can be inserted into and through subassembly 5 to maintain the parts together. The dimensions of the several components of the subassembly 5 and of the overall cell can be varied to meet particular size requirements for the type of cell being assembled.

The subassembly 5 is inserted into the bottom of the inverted cell as shown in FIG. 3. The peripheral wall 19 of the seal member 9 insulates the neutral cover 37 from electrical contact with the container 4. To complete assembly of the cell, a bottom cover 58 is placed into the steel container 4 and is also insulated from contact with the container 4 by the peripheral wall 19 of seal member 9. The bottom cover 58 makes electrical contact with the nail 7, or other suitable electrically conductive means, enabling the bottom cover 58 to become the second external terminal for cell 3. The edge of the steel container 4, and of the subassembly 5, are then rolled to hold the upturned portion 60 of the bottom cover 58 locked in position on the bottom of the cell 3. A gap 62 surrounds the bottom cover 58, separating it from contact with the container 4. The bottom cover 58 contains three small apertures 64, one of which is shown in FIG. 3, spaced approximately 120° apart which provide a passage for air to enter into the bottom of the cell 3. The air can pass through the subassembly 5 and contact the top portion of the cathode 6 through the air passage 21. The top cover 66 can be fastened to the container by welds 68 after the cathode is rammed into place. It can be added before or after this step as it is merely attached to the container 4.

EXAMPLE

Several lots of D-size air-assisted alkaline cells (Sample A) of the present invention as shown in FIG. 1 were tested in storage for leakage. The multilayer film seal of each cell consisted of two layers of polytetrafluoroethylene film, each 4 mils thick, sandwiched between two layers of polypropylene film, each 4 mils thick. The multilayer film was ultrasonically welded as described in conjunction with FIG. 1. Similar cell lots (Sample B) were produced except that the seals for the cells were made with two layers of polypropylene ultrasonically welded to the polypropylene seal. At 45° C. with 90% relative humidity (RH) for 12 weeks, the shelf leakage of the cells of Sample A and Sample B were observed and the results showed that the average leakage for the Sample A cells was 95% less than the average leakage for the Sample B cells. At 37° C. with 77% RH for 20 weeks, the average leakage for the Sample A cells was 60% less than the average leakage for the Sample B cells. At 45° C. with 50% RH for 12 weeks there was no leakage for the Sample A cells while the Sample B cells had an average leakage of 20%. At 71° C. for 8 weeks, there was no leakage for the Sample A cells while the Sample B cells had an average leakage of 50%.

Though the invention has been described with respect to preferred embodiments thereof, many variations and modifications will become apparent to those skilled in the art. It is therefore the intention that the appended claims be interpreted as broadly as possible in view of the prior art to include all such variations and modifications.

What is claimed is:

1. An air-assisted cell comprising active components of the cell, including an electrolyte, all of which are assembled within a container closed by a cover having at least one opening and said cover associated with a seal assembly comprising an organic polymeric seal member having a base with at least one opening and a multilayer plastic film disposed onto the base of said seal member, said multilayer plastic film comprising at least one inner layer of a first plastic film sandwiched between two outer layers of a different type of plastic film with said two outer layers having substantially the same melting temperature and said melting temperature being lower than the melting temperature of the at least one inner layer of the first plastic film; said two outer layers and said at least one inner layer being porous to permit air to pass through with said inner layer preventing the passage of the electrolyte from the cell; said multilayer film heat sealed at least at its peripheral area so that said two layers form an integral bond through said inner layer at the peripheral area thereby permitting air to pass through the multilayer film but preventing the cell's electrolyte from passing through.

2. The air-assisted cell of claim 1 wherein said seal member has a centrally located upstanding wall defining an opening in the base of the seal member and a peripheral upstanding skirt, said multilayer film has a centrally defined opening to accommodate the upstanding wall and said multilayer film disposed onto the base of the seal member between the centrally located upstanding wall and the upstanding peripheral skirt, and wherein said multilayer film is heat sealed at its peripheral area adjacent the upstanding peripheral skirt and to the base of the seal member, and heat sealed at its inner area adjacent the centrally located upstanding wall and to the base of the seal member.

3. The air-assisted cell of claim 2 wherein the two outer layers are polypropylene.

4. The air-assisted cell of claim 3 wherein the inner film comprises two layers of polytetrafluoroethylene.

5. The air-assisted cell of claim 2 wherein the inner film is polytetrafluoroethylene.

6. The air-assisted cell of claim 5 wherein the inner film comprises two or more layers.

7. The air-assisted cell of claim 6 wherein the two outer layers of film are polypropylene.

8. The air-assisted cell of claim 7 wherein the seal member is polypropylene.

9. The air-assisted cell of claim 8 wherein the base of the seal member has a plurality of spaced apart openings.

10. The air-assisted cell of claim 9 wherein the top layer of the two outer layers has at least one opening to permit the inner film to project through said at least one opening with minimum resistance.

11. The air-assisted cell of claim 2 wherein said inner film and said two outer layers of film are selected so that they will rupture when the pressure within the cell exceeds a predetermined level.

12. The air-assisted cell of claim 1 wherein the inner film is polytetrafluoroethylene.

13. The air-assisted cell of claim 12 wherein the inner film comprises at least two layers and each layer being from 3 mils to 5 mils thick.

14. The air-assisted cell of claim 13 wherein each of the two outer layers are from 1 mil to 4 mils thick.

15. The air-assisted cell of claim 1 wherein the two outer layers of film are polypropylene.

16. The air-assisted cell of claim 15 wherein the inner film is polytetrafluoroethylene.

17. The air-assisted cell of claim 1 wherein the two outer layers are the same material.

18. The air-assisted cell of claim 1 wherein the top layer of the two outer layers has at least one opening to permit the inner film to project through said at least one opening with minimum resistance.

19. The air-assisted cell of claim 1 wherein the seal member is polypropylene and a plurality of spaced apart openings are defined in the base to permit air to pass through from the multilayer film.

20. The air-assisted cell of claim 1 wherein said inner film and said two outer layers of film are selected so that they will rupture when the pressure within the cell exceeds a predetermined level.

21. An air-assisted cell comprising the active components of the cell, including an electrolyte, assembled within a container having an open end sealed with a seal assembly comprising an organic polymeric seal member having a base with at least one opening and a multilayer plastic film disposed onto the base of said seal member, said multilayer plastic film comprising at least one inner layer of a plastic film sandwiched between two outer layers of plastic film wherein said two outer layers of plastic film have substantially the same melting temperature which is lower than the melting temperature of the first plastic film; said two outer layers and said at least one inner layer being porous to permit air to pass through with said inner layer preventing the passage of the electrolyte from the cell; said multilayer film heat sealed at least at its peripheral area so that said two outer layers form an integral bond through said inner layer at the peripheral area thereby permitting air to pass through the multilayer film but preventing the cell's electrolyte from passing through.

22. The air-assisted cell of claim 21 wherein said inner film and said two outer layers of film are selected so that they will rupture to release excessive internal of the cell.

* * * * *